United States Patent [19]

Salomonsson et al.

[11] Patent Number: 4,772,046
[45] Date of Patent: Sep. 20, 1988

[54] SEAT BELT TENSIONING ARRANGEMENT FOR AUTOMOTIVE VEHICLES

[75] Inventors: Ove Salomonsson, Göteborg; Sture Alm, Partille, both of Sweden

[73] Assignee: AB Volvo, Göteborg, Sweden

[21] Appl. No.: 9,048

[22] Filed: Jan. 29, 1987

[30] Foreign Application Priority Data

Feb. 10, 1986 [SE] Sweden .................................. 8600573

[51] Int. Cl.⁴ ............................................. B60R 22/34
[52] U.S. Cl. ................. 280/806; 242/107.4 R; 297/480
[58] Field of Search ................. 280/801, 806, 808; 242/107, 107.1, 107.4 R, 107.4 A; 297/476, 478, 480

[56] References Cited

U.S. PATENT DOCUMENTS

| 3,561,817 | 2/1971 | Needham | 297/480 |
| 4,032,174 | 6/1977 | Andres et al. | 297/476 |
| 4,256,273 | 3/1981 | Burleigh | 242/107.4 R |

FOREIGN PATENT DOCUMENTS

| 3229260 | 2/1984 | Fed. Rep. of Germany ... 242/107.4 R |
| 1258697 | 4/1961 | France ................................. 297/480 |

Primary Examiner—John J. Love
Assistant Examiner—Karin L. Ferriter
Attorney, Agent, or Firm—Young & Thompson

[57] ABSTRACT

The invention relates to an arrangement for tensioning a seat belt in an automotive vehicle in the event of a collision. The belt extends through a slot in a displaceable and rotatable drum. One end of a tensioning strap is inserted into the slot and connected to a wedge located therein. The other end of the tensioning strap is attached to the chassis of the vehicle. When the drum is rotated, by means of a drive means intended herefor, both the tensioning strap and the belt strap are reeled onto the drum, therewith causing the drum to be displaced downwards while reducing the effective length of the belt strap.

6 Claims, 3 Drawing Sheets

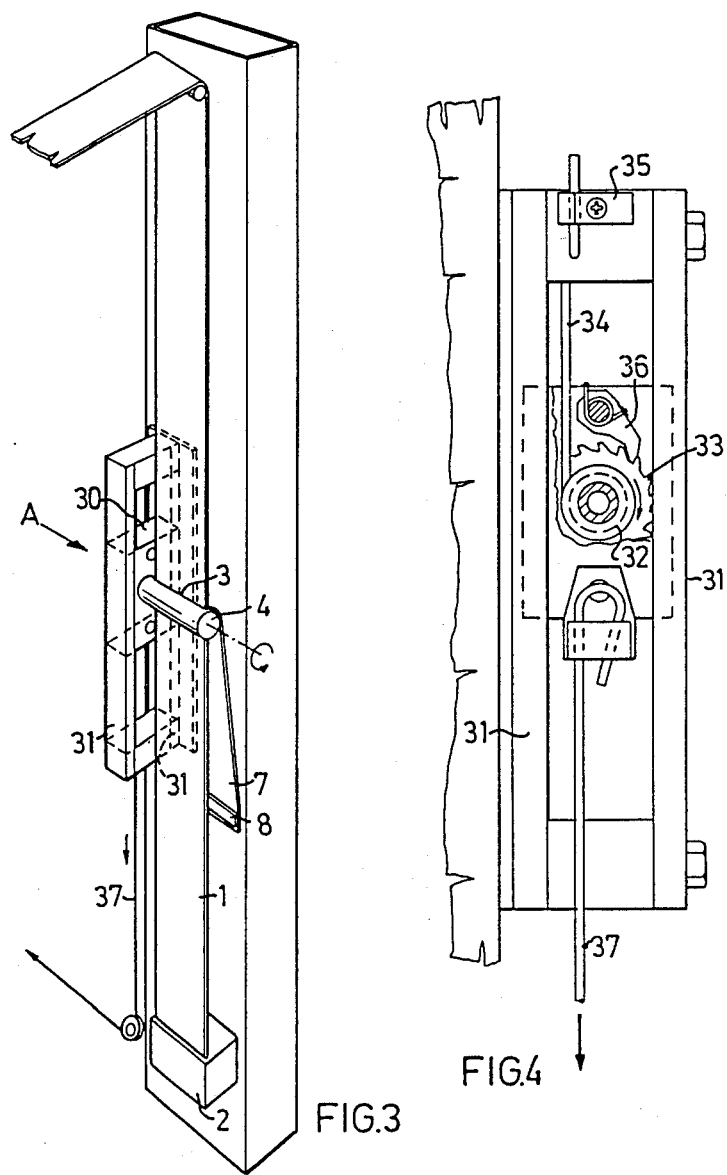

SEAT BELT TENSIONING ARRANGEMENT FOR AUTOMOTIVE VEHICLES

The present invention relates to an arrangement for tensioning a seat belt in an automotive vehicle, the arrangement comprising a displaceably and rotatably mounted reeling element which is provided with drive means and so arranged relative to a belt strap forming part of the seat belt arrangement that in a starting position of the reeling element the strap is able to slide axially in relation to the element and, upon activation of the drive means, is reeled onto the reeling element with subsequent shortening of the effective length of the belt strap, and which arrangement further comprises latching means which, subsequent to movement of the reeling element from said starting position, are operative in preventing the reeling element from rotating in a direction opposite to that in which the belt strap is reeled-in.

Seat-belt safety arrangements for automotive vehicles have been constructed with a fundamental view to the comfort of the wearer and also with a view to a number of technical problems, such as the appreciable amount of slack that occurs between the body of the wearer and the safety belt itself. This slack delays retardation of the wearer in the case of an abrupt deceleration of the vehicle, and in the event of more serious collisions may permit the wearer, before being restrained by the belt strap, to move forward in the seating compartment of the vehicle to such an extent as to strike the steering wheel or the instrument panel, or dashboard, of the vehicle.

Part of this slack is created by the clothes of the person wearing the seat belt, and also by the inherent suppleness of his or her body. Another factor that contributes towards the creation of excessive slack, however, and therewith to the extent to which the wearer of a seat belt may be thrown forward before being restrained, resides in the fact that the hip supporting part of the seat belt arrangement is redistributed to the diagonal, chest supporting part thereof, when the belt wearer is pressed down into his or her seat.

Another problem encountered with seat belt arrangements relates to the belt take-up reel, which when in its starting or neutral position has about 600 mm of belt reeled thereon, thereby enabling the wearer to move in his or her seat during a journey. This length of belt, however, is liable to be packed on the belt take-up reel in the event of a collision, due to the large forces exerted on the belt by the wearer under such an occasion. As a result hereof, the effective belt length can be increased by up to 150 mm in the event of a collision.

In one known solution of the kind described in the introduction, the reeling element comprises a drum which incorporates a slot through which the belt strap is extending. By activating, at the moment of collision, a drive means which rotates the drum, it is possible to reduce the effective length of the belt by up to about 100 mm. This is not sufficient, however, and the belt reel should preferably be fully disengaged from the seat belt system because of residual slack due to the film spool effect.

Efforts have been made to eliminate the film spool effect, by locking the belt strap independently of the belt reel with the aid of various eccentric functions, although without particular success.

The object of the present invention is to provide an effective tensioning mechanism which will also lock a length of retracted belt strap and thereby disengage the belt reel from the effective length of said strap.

This is achieved in accordance with the invention with the aid of a flexible, elongated tensioning element which is connected to the reeling element and also to an attachment fitting located on the chassis of the vehicle, in a manner such that rotation of the reeling element will also result in the reeling of the tensioning element, with subsequent displacement of the reeling element towards the attachment fitting. In accordance with one embodiment of the invention, the reeling element is forced to roll downwards on the tension element, therewith doubling the length of belt strap reeled-in, in relation to the rotation effected.

The length of belt strap that is reeled-in is locked against withdrawal through the action of the latching means, and the forces in the belt are transmitted to the vehicle chassis, independently of the belt reel.

The invention will now be described in more detail with reference to exemplifying embodiments thereof illustrated in the accompanying drawings, in which FIGS. 1a–1c are side views which illustrate schematically the operating principle of an arrangement according to the invention in three different operating states of the arrangement;

FIG. 3 is a schematic view in perspective of a preferred embodiment of the invention; and FIG. 4 is a view taken in the direction of the arrow "A" in FIG. 3.

Figure 1:
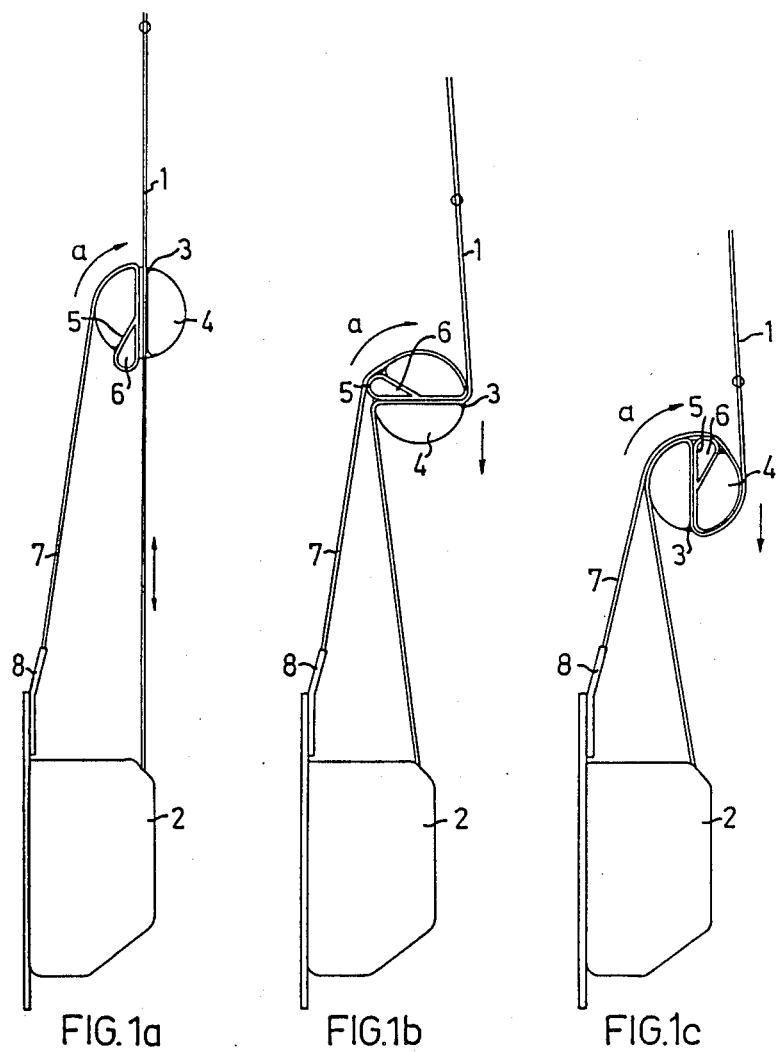

In the Figures the reference 1 designates a belt strap, or safety strap, of a seat belt assembly, the strap being connected to a reel mechanism 2 anchored to the chassis of the vehicle in a conventional manner. The belt strap 1 passes through a slot 3 located in a rotatable cylindrical drum 4, which is journalled for displacement in the vehicle chassis in a manner described hereinafter with reference to FIGS. 2–4. In the position illustrated in FIG. 1a, the belt strap 1 is able to slide freely in the slot, and the seat belt can therefore be put-on, taken-off and able to accompany the movements of the wearer without being influenced by the belt tensioning or take-up drum.

The slot 3 has a part 5 which widens outwardly to provide a V-shape configuration, in which a wedge 6 is mounted. One end of the wedge 6 is connected to a tensioning strap 7 which extends into the slot 3. The other end of the tensioning strap 7 is connected to an attachment fitting 8 anchored to the chassis of the vehicle, e.g. in the bottom region of the "B-pillar" thereof.

The drum 4 in FIGS. 1a–1c is connected to a drive means (not shown) for rotating the drum in the direction of the arrow a. The drive means is, in turn, controlled by a conventional device which responds to retardation forces and which in the initial stage of a collision is operative in causing the drive means to rotate the drum 4.

The various components are shown in FIG. 1 in their respective normal, neutral positions. In the event of a collision, the drum 4 begins to rotate (FIG. 1b), whereupon a tension force is applied to the tensioning strap 7, thereby causing the wedge 6, in this initial stage, to be pulled into the V-shaped part of the slot, so as to pinch the belt strap firmly in the slot 3. The wedge 6 has a part thereon which extends beyond the peripheral surface of the drum 4, such that the tensioning strap is pressed against the outer surface of the wedge subsequent to the drum rotating through as little as one quarter of a revolution, thereby further amplifying the locking force. As the drum rotates, it takes up both the tensioning strap 7 and the belt strap 1. As a result hereof, the drum 4 will "climb" down the tensioning strap 7 at the same time as the belt strap 1 is wound onto the drum. Consequently, rotation of the drum through one half of a revolution will result in the effective length of the belt strap being shortened by an extent commensurate with the full circumference of the drum. Overlapping between the tensioning strap 7 and the belt strap 1 will provide frictional locking between the drum and the belt strap, which complements the locking effect afforded by the wedge 6 and which increases proportionally with the force exerted by the wearer on the belt strap. At this stage, subsequent to tensioning the belt strap, the reel mechanism 2 is disconnected from the effective length of belt strap.

Figure 2:
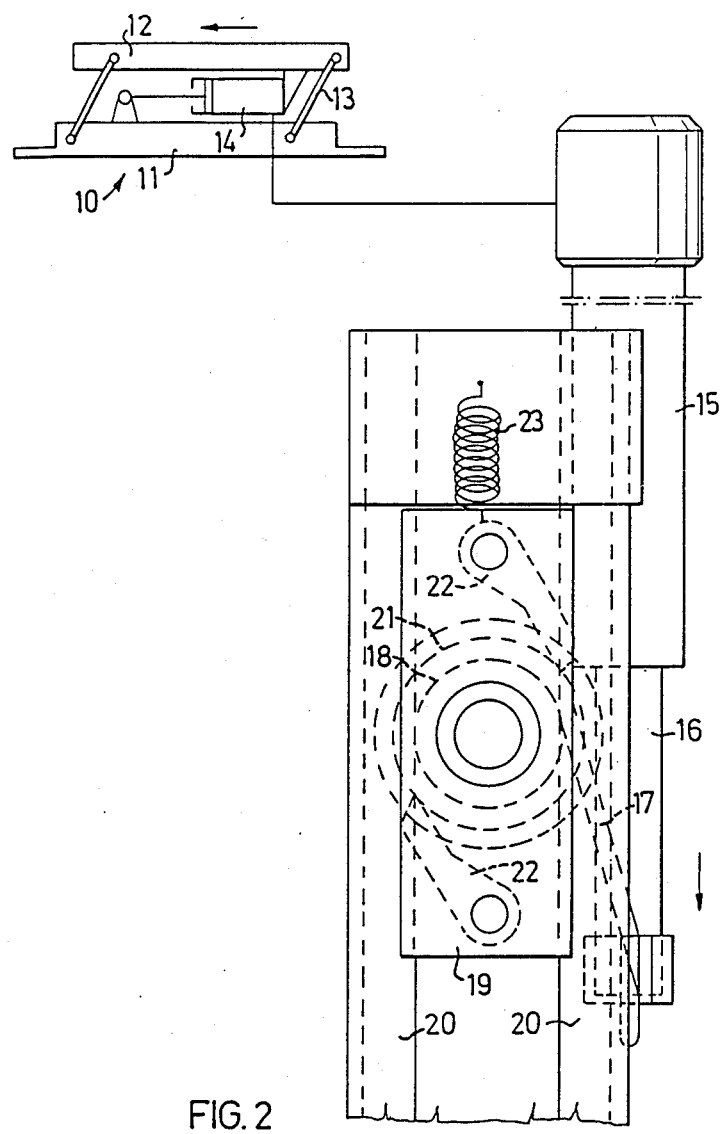
FIG. 2 illustrates schematically an embodiment of an arrangement according to the invention driven by means of a pressure medium.

The collision can be detected by a retardation-responsive sensor which is operative in activating a drive arrangement that includes an explosive charge, a gas generator or some corresponding device. Alternatively the inertia masses which are set into motion by a collision may be permitted to act directly on the belt tensioning arrangement. An example of this latter solution is illustrated in FIG. 2, in which the reference 10 indicates generally a seat base comprising a part 11, which is firmly anchored to the vehicle chassis, and a part 12, which is able to move axially relative to the part 11. The parts 11 and 12 are interlinked by arms 13 and have mounted therebetween a piston-cylinder device 14. The device 14 communicates with a further piston-cylinder device 15 securely mounted on the vehicle chassis, e.g. on the "B-pillar". Connected to the piston 16 of the device 15 is a wire 17 which is reeled onto a part 18 of the drum 4, said drum being rotatably mounted on two end walls 19 (only one is shown) which are displaceably mounted in vertical guides 20, e.g. provided on the "B-pillar". The drum 4 has provided thereon a toothed annulus 21 which co-acts with two latching pawls 22.

The described arrangement operates in the following manner: At the moment of collision the seat part 12 moves forwards resulting in a compression stroke of the hydraulic piston-cylinder device 14 and a subsequent flow of hydraulic fluid from the device 14 to the piston-cylinder device 15. The piston rod 16 of the device 15 is therewith urged downwards, causing the wire 17 to be unreeled from the part 18 of the drum 4. During the ensuing rotation of the drum 4, the tensioning strap 7 and the belt strap 1 are wound onto the drum, while moving the end walls 19 downwards in the guides 20. This downward movement of the end walls takes place against the action of springs, as illustrated schematically at 23. Subsequent to taking up the slack, the capturing force in the belt strap increases and strives to rotate the drum 4 in the return direction. This return movement is prevented, however, by the engagement of the pawls in the teeth of the toothed annulus 21, so that the force prevailing in the belt strap is transmitted to the chassis via the non-return latching means and the tensioning strap.

FIGS. 3 and 4 illustrate a modified version in which the drum 4 is rotatably mounted in a slide 30 which is displaceably arranged in guides 31 provided on the "B-pillar". Attached to the drum 4 is a wire take-up spool 32 and a toothed annulus 33. The spool 32 has wound thereon a wire 34, which is anchored to an attachment fitting 35. The toothed annulus 33 co-acts with two latching pawls 36 (only one of which is shown), which lock the drum 4 against rotation in an anticlockwise direction. The slide 30 is connected to a tensioning wire 37 corresponding to the tensioning wire 17 in FIG. 2. The wire 37 may be connected to a piston-cylinder-system corresponding to the system of the FIG. 2 embodiment, or may be mechanically connected directly to the moveable seat part 12. This arrangement comprising a wire 34 which is anchored directly to the vehicle, and a tensioning wire 37 which acts directly on the slide 30 enables the requisite length of stroke of the applied movement to be reduced by half in comparison with the arrangement illustrated in FIG. 2, in which the movement is applied via a wire 17 drawn around the drum 4.

We claim:

1. An arrangement for tensioning a seat belt in an automotive vehicle, comprising a displaceably and rotatably mounted reeling element which is provided with drive means for rotating said reeling element in one direction, and which is so arranged in relation to a belt strap forming part of the seat belt that in a starting position of the reeling element the belt strap is able to slide axially in relation to said element, with subsequent shortening of the effective length of the belt strap, and which further comprises latching means which, subsequent to movement of the reeling element from said starting position, prevent said element from rotating in a direction opposite to the reeling direction, characterized in that a flexible elongated tensioning element is connected to the reeling element and to an attachment fitting located on the chassis of the vehicle, in a manner such that rotation of the reeling element by said drive means in said one direction also results in reeling of the tensioning element and subsequent displacement of the reeling element towards said attachment fitting.

2. An arrangement according to claim 1, characterized in that the reeling element is a drum which incorporates a through-passing slot through which the belt strap extends; and in that the tensioning element is connected to a wedge which, when a tensioning force is applied thereto by the tensioning element, clamps the belt strap firmly in said slot.

3. An arrangement according to claim 2, characterized in that the tensioning element is a strap which extends into the slot and is connected to the wedge; and in that the wedge is located in a wedge-shaped part of the slot.

4. An arrangement according to claim 3, characterized in that the wedge is dimensioned in a manner such that the wider part of the wedge will always extend beyond the peripheral surface of the drum.

5. An arrangement according to claim 2, characterized in that the latching means comprises a toothed annulus connected to the drum and at least one latching pawl which co-acts with the toothed annulus to prevent the drum from rotating in a direction opposite to the reeling direction.

6. An arrangement according to claim 2, characterized in that the drum is rotatably journalled in a slide which is displaceably mounted in a vertical guide means and is connected to drive means operative in displacing the slide towards said attachment fitting; and in that a second flexible tensioning element is attached to and reeled onto a part of said drum and is also attached at one end to the vehicle chassis, and is intended to cause the drum to rotate in the reeling direction of the first tensioning element.

* * * * *